United States Patent [19]
Dade et al.

[11] Patent Number: 5,229,677
[45] Date of Patent: Jul. 20, 1993

[54] ELECTRIC PROPULSION MOTOR FOR MARINE VEHICLES

[75] Inventors: Thomas B. Dade, Poquoson; Kenneth W. Leiding, Norfolk, both of Va.; Peter P. Mongeau, Hopkinton; Mark S. Piercey, Framingham, both of Mass.

[73] Assignee: Newport News Shipbuilding and Dry Dock Company, Newport News, Va.

[21] Appl. No.: 764,505

[22] Filed: Sep. 18, 1991

[51] Int. Cl.$^5$ .......................... H02K 1/22; B60L 11/00
[52] U.S. Cl. ..................................... 310/268; 310/112; 318/432; 318/538
[58] Field of Search ............... 318/538, 558, 588, 138, 318/139, 254, 430, 431, 432, 433, 632; 310/51, 68 R, 87, 98, 112, 152, 156, 268, 67 R

[56] References Cited

U.S. PATENT DOCUMENTS

| | | |
|---|---|---|
| 3,226,579 | 12/1965 | Bygdnes . |
| 3,230,406 | 1/1966 | Henry-Baudot . |
| 3,953,751 | 4/1976 | Merkle et al. . |
| 4,072,881 | 2/1978 | Ban . |
| 4,104,552 | 8/1978 | Tsergas . |
| 4,358,693 | 11/1982 | Palmer et al. . |
| 4,371,801 | 2/1983 | Richter . |
| 4,394,594 | 7/1983 | Schmider et al. . |
| 4,464,592 | 8/1984 | Major . |
| 4,503,349 | 3/1985 | Miller . |
| 4,551,645 | 11/1985 | Takahashi et al. . |
| 4,578,610 | 3/1986 | Kliman et al. ........................ 310/156 |
| 4,617,484 | 10/1986 | Buijsen ................................. 310/51 |
| 4,623,812 | 11/1986 | van de Griend ..................... 310/268 |
| 4,629,920 | 12/1986 | Hermann .............................. 310/156 |
| 4,634,912 | 1/1987 | Heyraud ............................... 310/268 |
| 4,645,991 | 2/1987 | Ban et al. ............................. 318/138 |
| 4,667,480 | 5/1987 | Bessler ................................. 62/180 |
| 4,691,133 | 9/1987 | Mongeau ............................. 310/178 |
| 4,703,243 | 10/1987 | Ettelman et al. .................... 318/696 |
| 4,751,415 | 6/1988 | Kitamori et al. .................... 310/156 |
| 4,761,590 | 8/1988 | Kaszman ............................. 318/254 |
| 4,823,040 | 4/1989 | Oudet ................................... 310/268 |
| 4,831,297 | 5/1989 | Taylor et al. ........................ 310/87 |
| 4,843,291 | 6/1989 | Predina ................................ 318/605 |
| 4,864,175 | 9/1989 | Rossi .................................... 310/156 |
| 4,866,321 | 9/1989 | Blanchard et al. ................. 310/112 |
| 4,872,118 | 10/1989 | Naidenov et al. ............. 318/588 X |
| 4,872,123 | 10/1989 | Morita ............................ 318/439 X |
| 4,910,449 | 3/1990 | Hiyama et al. ..................... 318/640 |
| 4,924,125 | 5/1990 | Clark ................................... 310/67 R |
| 4,931,713 | 6/1990 | Matjukhina et al. ................ 318/632 |
| 4,933,584 | 6/1990 | Harms et al. ........................ 310/162 |
| 4,962,976 | 10/1990 | Takahashi et al. ................... 318/81 |
| 4,996,457 | 2/1991 | Hawsey et al. ..................... 310/268 |
| 5,078,628 | 1/1992 | Garis, Jr. ........................ 310/87 X |

*Primary Examiner*—Bentsu Ro
*Attorney, Agent, or Firm*—Lalos & Keegan

[57] ABSTRACT

An improved electric propulsion motor for marine vehicles. The motor has an axial gap design with a disk-shaped rotor and two disk-shaped stators. Within the large, open diameter of the motor a sound isolation coupling is disposed between two annular plates that connect the rotor to the propeller shaft. Circumferential thrust bearings counter and distribute electrical and mechanical forces in the motor to maintain the position of the rotor relative to the stators. A journal bearing supports the rotor. Noise reduction is greatly enhanced by the implementation of staggered stators, skewed stator slots, skewed field poles and a current control system that compensates for torque pertubations that are a repeatable function of shaft angle.

35 Claims, 8 Drawing Sheets

ELECTRIC PROPULSION MOTOR FOR MARINE VEHICLES

FIELD OF INVENTION

This invention relates generally to electric motors and more particularly to propulsion motors for marine vehicles.

BACKGROUND OF THE INVENTION

Marine vehicles typically employ one or more rotating propellers disposed beneath the water line of the vessel for surface vessels or disposed within a portion of the hull of submersible vessels.

Typically, the propellers in submersible systems have been driven by diesel power, steam turbines or electric motors mounted within the hull of a vessel. A propeller shaft extends through the hull to the propeller mounted on the shaft outside the hull. Such systems have the disadvantage of noise and vibration radiating from the rotating components. Also, such systems typically occupy a great deal of the interior hull space. The motor, typically, is a primary source of noise and vibration. The source of such noise in an electric motor is often torque ripple due, for example, to cogging, i.e., variations in magnetic flux that are related to rotor position, reluctance, and the mechanical coupling between the rotor and propeller shaft.

SUMMARY OF THE INVENTION

It is an object of the invention to provide a motor for marine vehicles with a minimum axial length to provide greater available hull space for purposes other than the motor.

Another object of the invention is to isolate the noise generated by the motor from the propeller shaft by providing a sound isolating coupling within the open center of the motor so as not to increase the axial length of the motor and related equipment.

A further object of the invention is t reduce the torque ripple in an electric motor due to cogging and thereby reduce noise.

It is yet a further object of the invention to reduce the torque ripple and resulting noise in the motor due to perturbations that are repeatable functions of shaft angle.

Another object of the invention is to provide an improved arrangement for handling and distributing electrical and mechanical forces on the rotor, such arrangement including a large diameter circumferential thrust bearing and journal bearing.

The electric propulsion motor of the present invention is substantially wheel-shaped and has as its major components a disk-shaped rotor and two disk-shaped stators. In a first embodiment, a single motor is mounted in the hull of a vessel and is axially aligned with a longitudinal axis of the vessel. In a second embodiment, two motors with counter-rotating propellers are installed. The shape of the motor, with a large diameter relative to its axial length, is advantageous in marine vehicles because it significantly reduces the total stack-up length of the motor and related couplings. This provides greater interior hull space for other equipment. In addition, the large diameter, open center of the motor permits the installation of a sound isolation coupling between the rotor and the propeller shaft. Such coupling does not add to the axial stack-up length of the motor assembly because it is located within the interior of the motor.

The two stators, mounted on either side of the rotor and separated therefrom by axial air gaps, are provided with armature windings that are fed by a controlled current source (power inverter modules). The rotor magnetic field is provided by permanent magnets mounted on a rotor disk. The rotor permanent magnet field reacts with a rotating magnetic field of the stators to produce rotational torque upon the rotor, which is transferred to the propeller shaft through the sound isolation coupling. Thrust bearings for the rotor are mounted circumferentially around each side of the rotor. This circumferential thrust bearing can be a single annular bearing or a plurality of spaced bearing assemblies. The rotor is supported on a radial bearing.

Each of the stators includes teeth and slots, with coils (conductors) being wound within the slots The rotor includes axially magnetized permanent magnets and the magnet flux crosses the air gap on both sides of the rotor. As the magnet pole passes the slots in the stators, cogging will result due to the preferred orientation of the pole with the teeth, where reluctance is minimum. This cogging gives rise to a component of torque ripple. In the present invention, cogging may be minimized by staggering the stators such that the teeth of one stator are oriented opposite the slots of the stator.

As an additional feature to reduce torque ripple, the stator slots are skewed, i.e. rather than being parallel to a diameter of the stator, the slots lie at an angle to the diameter. Alternately or additionally, the magnet poles may also be skewed such that a diameter of the rotor will not be collinear with a central longitudinal dividing line of the magnet pole. Also, the sides of each pole are slightly curved. To further reduce the cogging effect, a large number of permanent magnet poles are formed in the rotor, seventy-eight in the embodiment shown in the drawings.

Torque ripple is also reduced by taking advantage of the fact that most of the total variation in torque is a repeatable function of rotor position. By varying the current in the motor as a function of rotor position (or shaft angle), the cyclic variations in motor torque can be greatly reduced. The present invention utilizes high speed switching elements and pulse width modulation to provide precise control over the current applied to the stator windings. The shaft-position-dependent information needed to compensate for torque variations is stored in one or more programmable read-only memories (PROMs). The instantaneous current command signal, which controls torque output, is modified by the compensation information stored in PROM to reduce torque ripple that is a function of shaft angle.

These and other features, objects and advantages of the present invention will be apparent from the foregoing drawings and detailed description.

DETAILED DESCRIPTION

Figure 1:
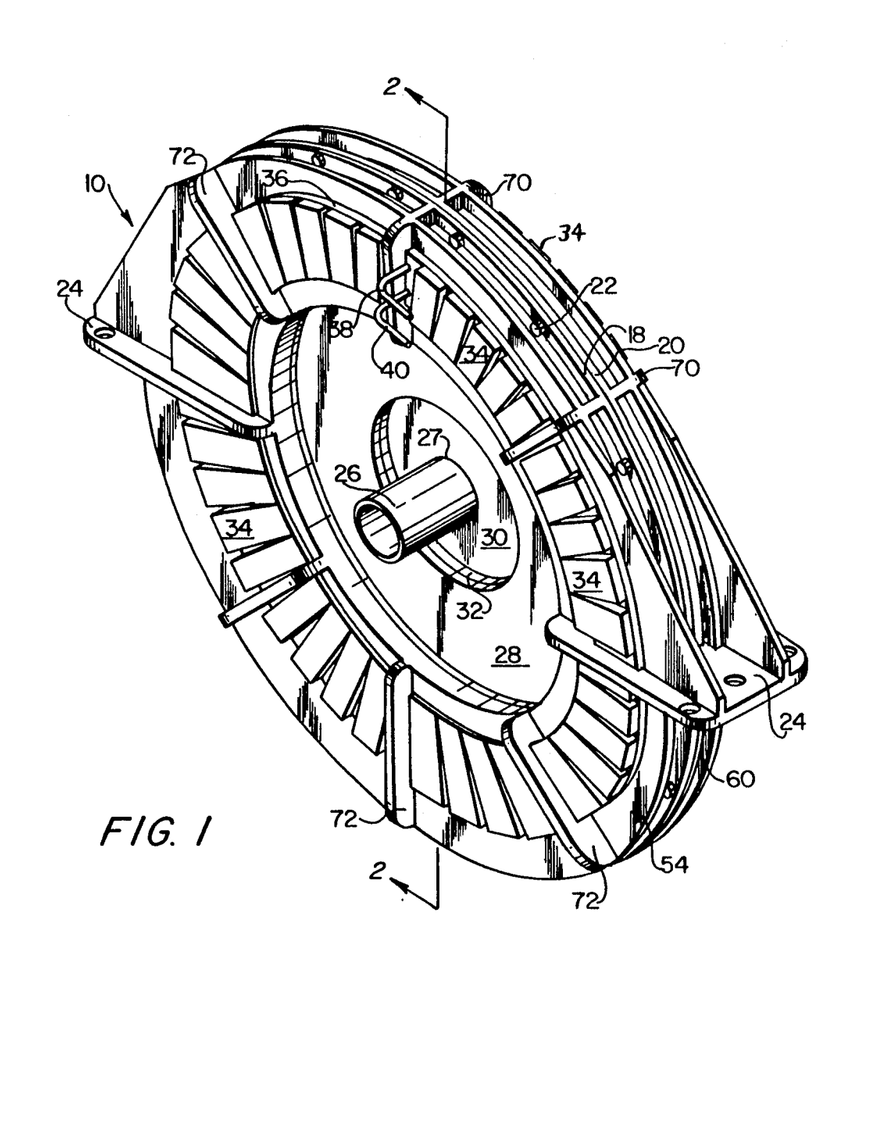
FIG. 1 is a perspective view of a preferred embodiment of the propulsion motor of the present invention.
Figure 2:
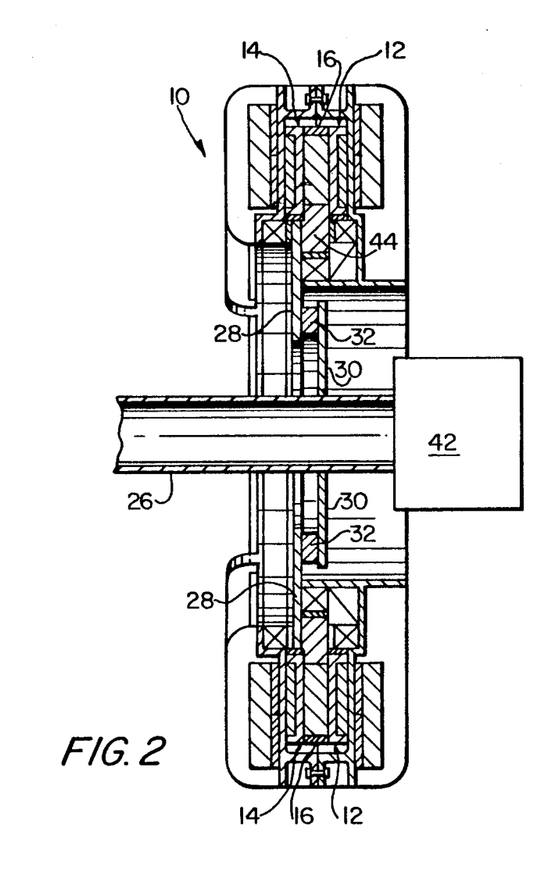
FIG. 2 is a cross-sectional view along the line 2—2 of FIG. 1.

FIG. 1 shows a perspective view of a preferred embodiment of the propulsion motor of the present invention. The motor 10 comprises three major components, two stators and a rotor (not individually visible in FIG. 1). The rotor 16 is disposed between the two stators 12, 14 (as shown in FIG. 2). As will be appreciated from FIG. 1, the motor 10 is substantially wheel-shaped, having a large diameter relative to its axial length. The short axial length of the motor is advantageous in marine vehicles. For example, the total length of the engine room is reduced due to the significantly shorter stack-up length of the shafting, coupling, thrust bearing and motor. See FIG. 7, for example. This provides greater available interior hull space for equipment, storage, crew quarters, weapon systems, etc.

As shown in FIG. 1, the structures of the two stators 12 and 14 are joined together at circumferential flange members 18 and 20 by bolt/nut combinations 22 or other suitable fasteners. The structure of each stator 12, 14 is also joined to large coupling flanges 24 that permit the motor 10 to be mounted in the ship's housing (see FIG. 6, for example).

The rotor 16 and stators 12 and 14 are substantially disk-shaped (see FIGS. 11 and 10, respectively, for example), with a large, open center. Referring to FIG. 1, this large, open center is utilized in the present invention for passage of the ship's hollow propeller shaft 26 and for the unique rotor/propeller shaft coupling arrangement of the present invention. In such arrangement, an annular rotor torque plate 28 (connected to the rotor 16 as shown in FIG. 2) extends radially inward toward propeller shaft 26. Coupled to and extending radially outward from propeller shaft 26 is shaft disk 30, which is connected (e.g. by welding) to the outer wall 27 of propeller shaft 26. The outer perimeter of plate 28 and disk 30 overlap, as best shown in FIG. 2. Interposed between these overlapping perimeter sections is a flexible sound attenuating coupling 32. Coupling 32 may be made of any suitable flexible material, preferably an elastomer, and is held in place under pressure between plate 28 and disk 30, which are held together by bonding, for example. This unique coupling arrangement provides an effective mean for isolating noise-inducing motor vibrations from the propeller output shaft. This is accomplished within the open center of the motor and thus adds no additional axial length to the motor assembly.

FIG. 1 also shows the arrangement of the inverter modules 34 located around the circumference of both stators 12 and 14. Inverter modules 34 function as a controlled current source for the stator coils as will be discussed hereinafter in more detail. Each group of five (5) inverter modules is cooled by a cold plate 36. Each plate is in the form of a segment of an annulus. Each plate 36 is divided longitudinally by a wall into two channels, with the wall open at one end to connect the two channels. Cooling fluid enters the radially outer channel through conduit 38, traverses the length of the plate, passes through the open end of the dividing wall and returns through the radially inner channel, exiting at conduit 40. Conduits 38 and 40 will be connected to an appropriate cool fluid supply and warm water disposal, respectively, which are not shown in FIG. 1.

Figure 3:
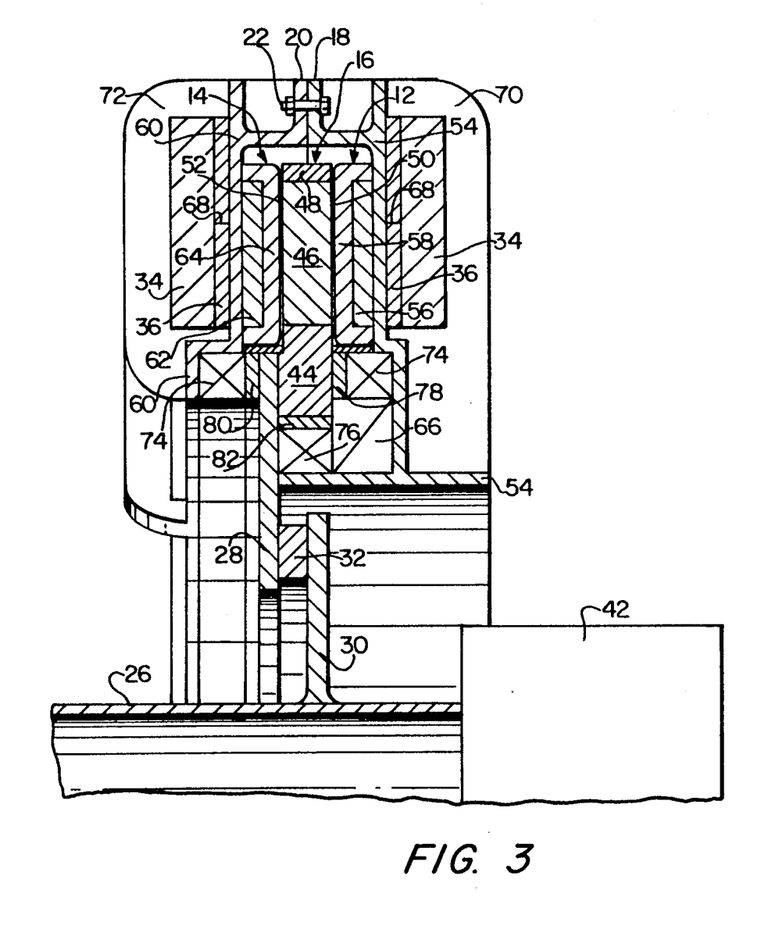
FIG. 3 is an enlarged view of the upper half of the assembly depicted in FIG. 2.

FIG. 2 shows a cross-section of the motor assembly and FIG. 3 is an enlarged cross-sectional view of the upper half of the motor. The cross-hatching has been omitted for clarity. As shown in FIG. 2, the upper and lower halves of the motor are identical. The motor 10 will typically by mounted in the hull of a vessel in surrounding relationship to the propeller shaft 26. The ship's thrust and journal bearings, which support the propeller shaft and transfer the propeller thrust to the ship, are conventional and shown generally as 42. FIG. 2 best illustrates the improved rotor/propeller shaft coupling of the present invention, in which the annular rotor torque plate 28 is connected (e.g. by welding) to a portion 44 of rotor 16. As described previously, propeller shaft disk 30 is connected to and extends radially from propeller shaft 26. Plate 28 and disk 30 are connected at their overlapping perimeter portions by bonding or other suitable means that will not contribute to the transmission of noise and/or vibrations. Sandwiched in between these two portions is sound attenuating coupling 32. Coupling 32, preferably an elastomer, is flexible and can absorb motor vibrations and isolate them from the propeller shaft, thus reducing transmission of noise into the shaft and thence into the hull structure and surrounding water. As will be appreciated, motor torque will be applied to the propeller shaft through plate 28, coupling 32 and disk 30. The torque is produced as a result of a rotating magnetic field set up by alternating current in the windings of stators 12, 14. The rotating magnetic field reacts with the permanent magnetic field in the rotor, which rotates on an annular bearing surface, as will be described.

Referring to FIG. 3, the rotor 16 is interposed between stators 12 and 14 and is separated therefrom by axial air gaps 50 and 52, respectively. Rotor 16 generally comprises permanent magnet material portion 46 and non-magnetic portions 44 and 48. Stator 12 generally comprises a mechanical support structure 54, stator backiron 56, and windings mounted in slots shown generally as 58. A gusset 66 is provided for stator 12 structure reinforcement. Similarly, stator 14 has a support structure 60, backiron 62, and windings in slots 64. As discussed previously, the two stator support structures are joined together at flange members 18 and 20 by bolt nut combinations 22 or other suitable fasteners. As reinforcement for the stator structure, reinforcing members 70 and 72 are provided at intervals around the circumference (see FIG. 1) of structures 54 and 60, respectively.

Located axially outside of each stator 12, 14 are inverter modules 34. Interposed between the stator support structure and inverter modules 34 is a cold plate 36. As discussed previously with reference to FIG. 1, each cold plate is divided by a wall, labeled 68 in FIG. 3, to guide cooling water along the length of each plate.

As a unique aspect of the present invention, circumferential thrust bearings 74 and radial bearing 76 support rotor 16 an counter and distribute electrical and mechanical forces in the motor to maintain the position of the rotor relative to the stators. Thrust bearings 74 are mounted to stator support structures 54 and 60 on each side of rotor 16 in proximity to the magnetically active portion, i.e. area 46, of the rotor. The thrust bearing assemblies may comprise solid annular bearings or a plurality of spaced thrust bearing assemblies (e.g. conventional tilting pad type) mounted on a rotor-facing circumferential surface of each stator support structure. The bearing surfaces of rotor 16 will comprise annular runners 78 and 80, which are attached to rotor 16 as will be described with reference to FIG. 4. Rotor 16 is supported on radial bearing 76, which may comprise a plain cylindrical bearing or a plurality of spaced bearing assemblies mounted on a rotor facing circumferential surface of stator support structure 54 and is remote from the propeller shaft 26. The radial bearing surface of rotor 16 will comprise annular runner 82. These circumferential bearing arrangements are uniquely suited to the large, open-diameter motor of the present invention.

Figure 4:
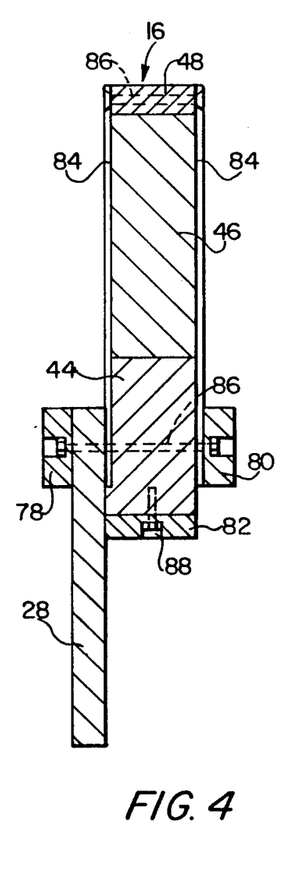
FIG. 4 is an enlarged view of the rotor and torque plate shown in FIG. 3.

FIG. 4 is an enlarged view of the rotor 16 and torque plate 28 shown in FIG. 3. The primary component of rotor 16 is a disk made of non-magnetic materials such as stainless steel, titanium, or composites. In FIG. 4, non-magnetic disk portions are labeled 44 and 48. In the present invention, permanent magnets are mounted in openings in the rotor disk. These permanent magnets mounted in the rotor disk are illustrated generally as area 46. In a smaller machine, the magnets may be placed directly in the openings and secured with an epoxy adhesive. In a larger machine, the magnets may be placed in magnet holders and the holders mechanically fastened inside the rotor openings. Additionally, as shown in FIG. 4, mechanical shields 84 with fasteners 86 passing through both shields secure the magnets. In a preferred embodiment, the permanent magnets are neodymium iron boron. Permanent magnets are rated by their energy product. The energy product is the product of B, magnetic flux density, and H, magnetic field intensity. The neodymium iron boron magnets are commercially available with energy products exceeding 30 megagauss oersteds. An advantage of the permanent-field rotor is that it eliminates the need for rotary electrical contacts and must absorb only very low heat losses. Thus, it does not require a complex or bulky cooling system. Further, the permanent magnets provide high power density when compared to other designs and are of relatively light weight.

FIG. 4 also illustrates the mounting of annular runners 78, 80 and 82. Annular runner 78 is mounted on the outside of rotor torque plate 28 and runner 80 is mounted on the outside of mechanical shield 84. Both runners 78 and 80 are secured by inner fastener 86. Annular runner 82 is mounted against the lower surface of portion 4 of the rotor disk and is secured in place by suitable fastener 88.

Figure 5:
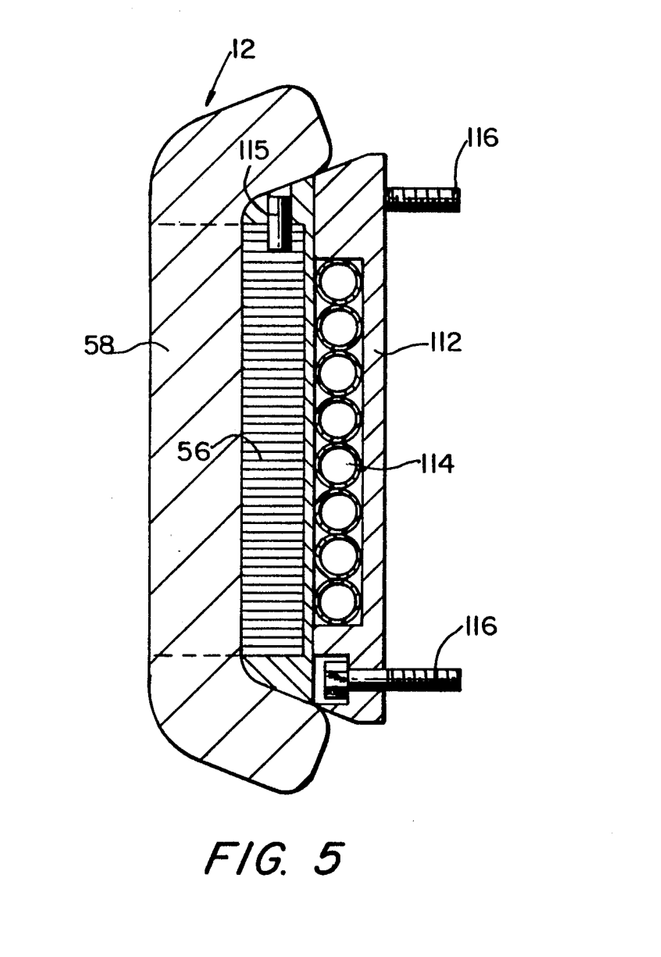
FIG. 5 is an enlarged cross-sectional view of one stator shown in FIGS. 2 and 3.

FIG. 5 is an enlarged cross-sectional view of stator 12 shown in FIGS. 2 and 3, it being understood that stator 14 will comprise the same structural components in an opposite orientation. The outline of the stator coils is represented by 58 and the stator backiron is represented by series of rectangular bands, labeled 56. FIG. 5 also illustrates the stator cold plate 112, not shown in the prior, less detailed, figures. Within stator cold plate 112 is a series of cooling channels 114 that serve to disperse heat generated by the stator coils. The backiron core 56, with surrounding coils 58, is connected to stator cold plate 112 by retaining pins, e.g. pin 115. This subassembly is then connected to the stator support structure 54 (FIG. 2) by suitable fasteners 116.

Figure 6:
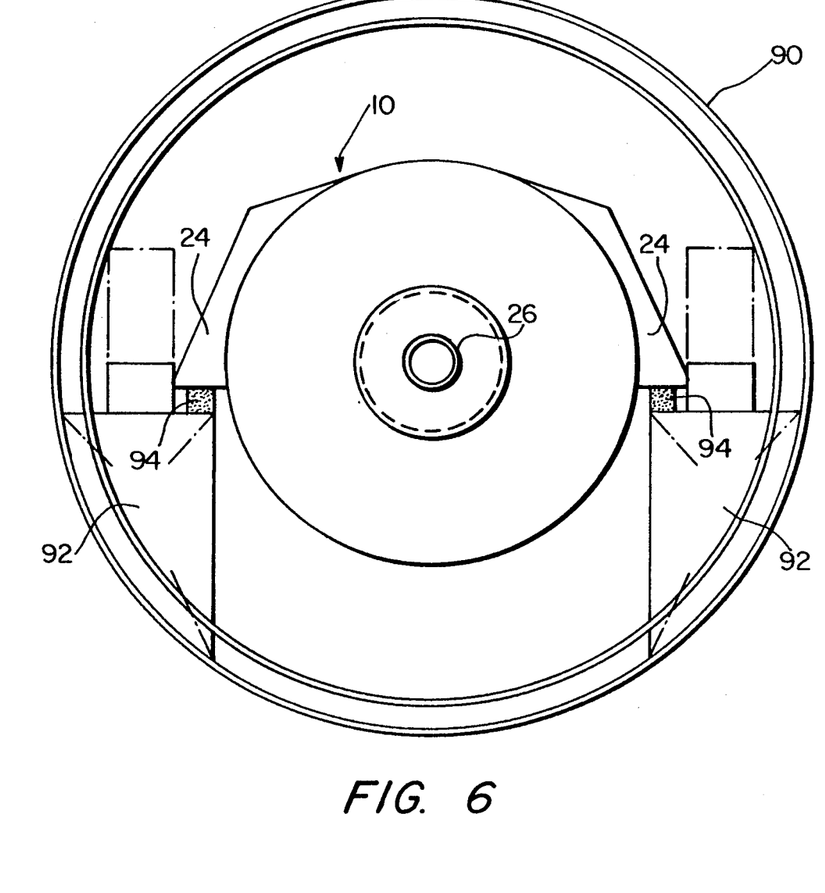
FIG. 6 is a cross-sectional view illustrating the mounting of the propulsion motor of the present invention in the hull of a ship.

FIG. 6 illustrates, in a cross-sectional view through the hull 90 of a marine vehicle, a typical mounting arrangement for motor 10. Motor 10 is mounted coaxially with the ship's propeller shaft 26 by securing large coupling flanges 24 to foundation members 92 in the interior of the hull. Preferably the motor will be mounted with some form of sound isolation member 94 (e.g. an elastomeric block) interposed between flanges 24 and foundation members 92.

Figure 7:
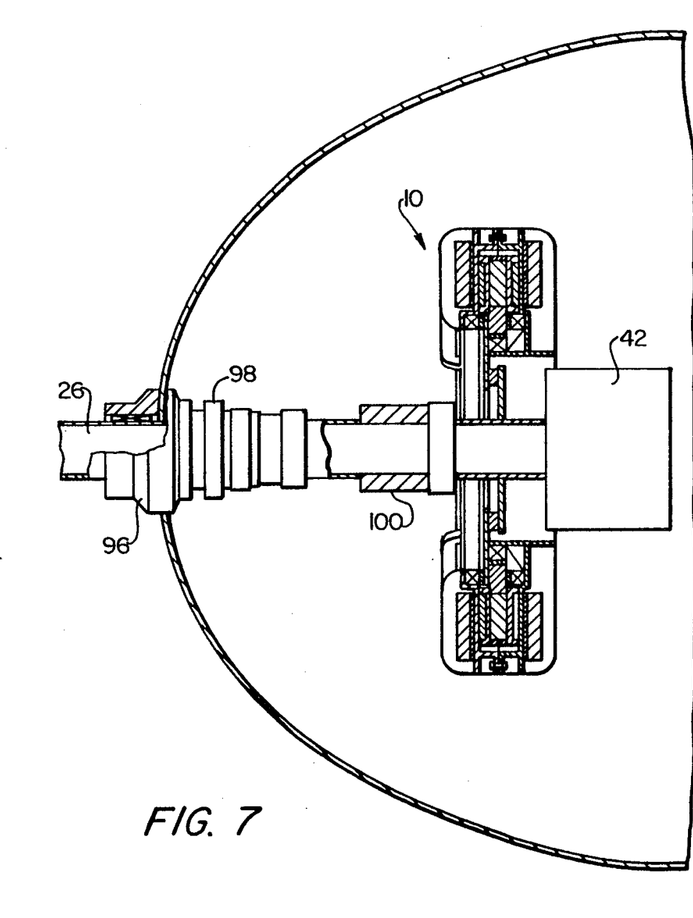
FIG. 7 is a partial cross-sectional view illustrating the single motor embodiment of the present invention.

FIG. 7 is a side cross-sectional view through the hull 90 of a marine vehicle, illustrating a typical arrangement of the propulsion motor of the present invention in a ship. Segments of a typical propeller shaft 26 mounting arrangement are shown generally, for example, stern tube with bearing 96, shaft seal 98, shaft coupling 100, and ship's thrust and journal bearing assembly 42.

Figure 8:
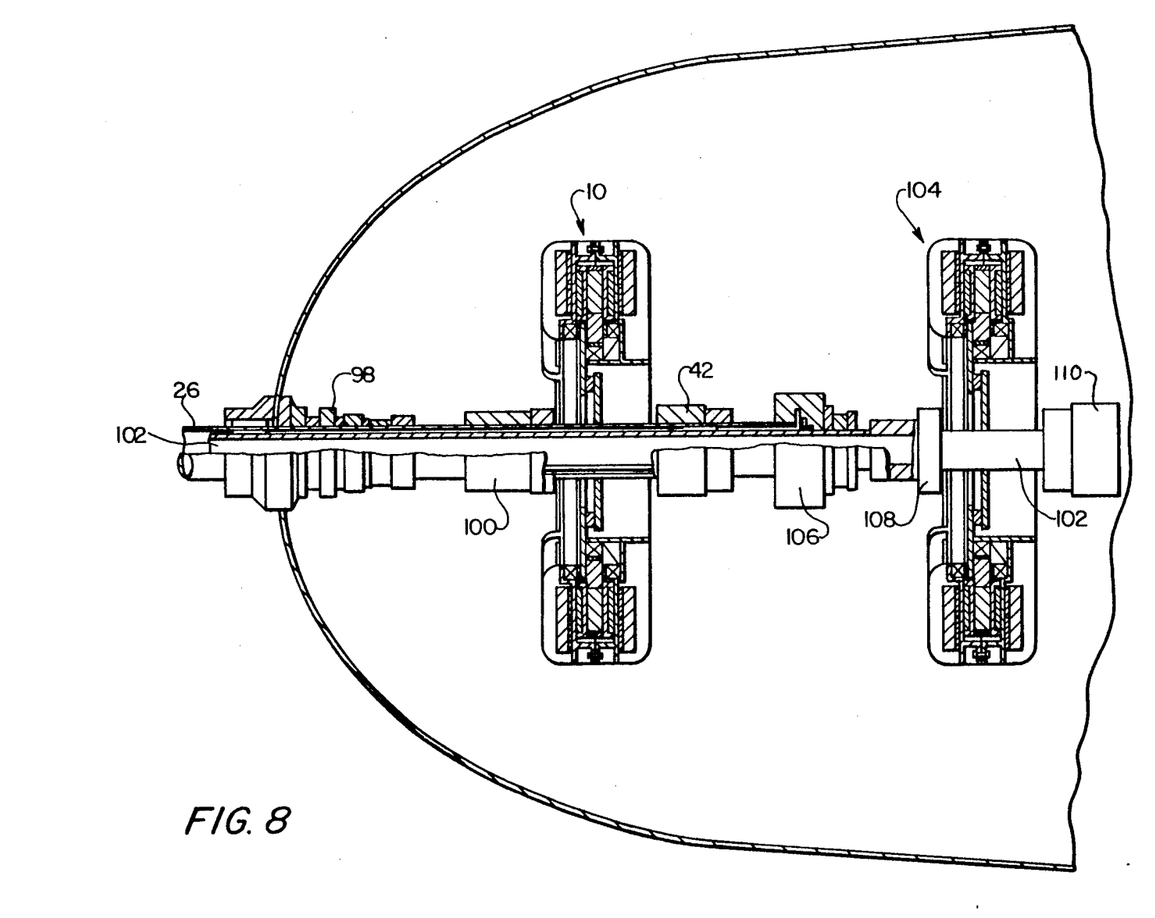
FIG. 8 is a partial cross-sectional view illustrating the dual counter-rotating embodiment of the present invention.

FIG. 8 is a representation illustrating a dual counter-rotating propeller shaft embodiment of the present invention. In this embodiment, an outer propeller shaft 26 is driven by propulsion motor 10, and an inner propeller shaft 102 is driven by propulsion motor 104 in a rotating direction opposite to the rotating direction of outer shaft 26. As is conventional, the blades of the propeller coupled to outer shaft 26 will be of opposite pitch to the blades of the propeller coupled to inner shaft 102. Some of the major components shown in FIG. 7 are stern tube with bearings 96 for both shafts, outer shaft seal 98, outer shaft coupling 100, ship's thrust and journal bearing assembly 42 for the outer shaft, inner/outer shaft seal 106, inner shaft coupling 108, and ship's thrust and journal bearing assembly 110 for the inner shaft. Dual counter-rotating propellers are used because of the hydrodynamic advantages that are realized. These advantages help in reducing power loss.

A principal advantage of the present invention is noise reduction. Noise results in electric motors, in part, because of mechanical vibrations caused by unstable and undesirable magnetic attractive forces, known as torque ripple. One component in the undesirable variation in torque is referred to as cogging torque, which occurs when the motor has armature teeth.

Figure 9A:
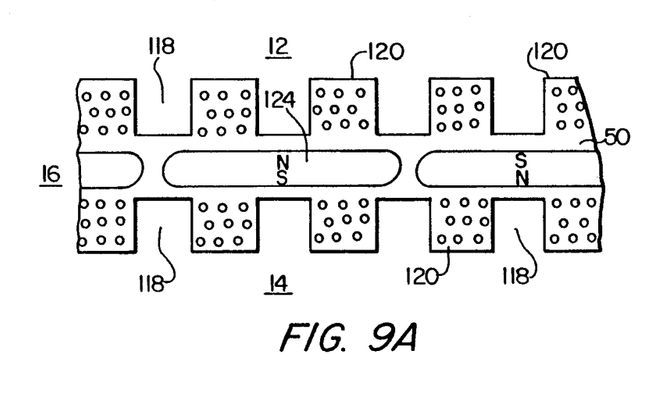
FIG. 9A is a representative view of two stators in alignment.
Figure 9B:
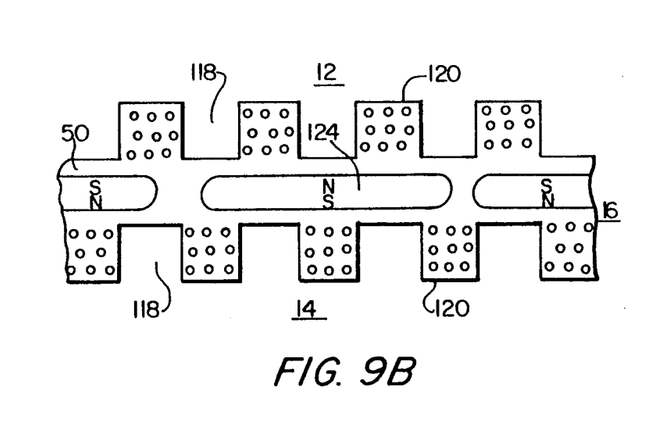
FIG. 9B is a representative view of the staggered stator feature of the present invention.

In the present invention, axially magnetized permanent magnets 46 are mounted on the rotor 16. Stators 12 and 14 are located on either side of rotor 16 and are separated therefrom by axial air gaps 50 and 52. The magnet flux crosses the air gap axially on both sides of rotor 16. FIG. 9 is a representation of how the problem of torque ripple caused by cogging may be ameliorated. FIG. 9A represents a first configuration of the stator 12 and 14 and the alignment of the teeth and slots of the stators, relative to the magnetic poles of the rotor 16. The "iron" teeth of the stators are labeled 118 and the slots, occupied by conductors and dielectric material, are labeled 120. Since the permeability of the stator iron is greater than air or the coils and dielectric, the flux density will be greater in the teeth than in the slots. As the magnet poles pass the slots, cogging will result due to the preferred orientation of the pole with the teeth, where reluctance is minimum. This cogging gives rise to a component of torque ripple that is independent of stator current. In the present invention, this cogging effect is minimized by staggering the stators, as shown in FIG. 9B, such that the teeth of one stator are oriented opposite the slots of the other stator. Thus, as a magnet pole is passing slots in one stator, it will also be aligning with teeth in the other stator, thereby countering the undesired magnetic attraction.

Figure 10A:
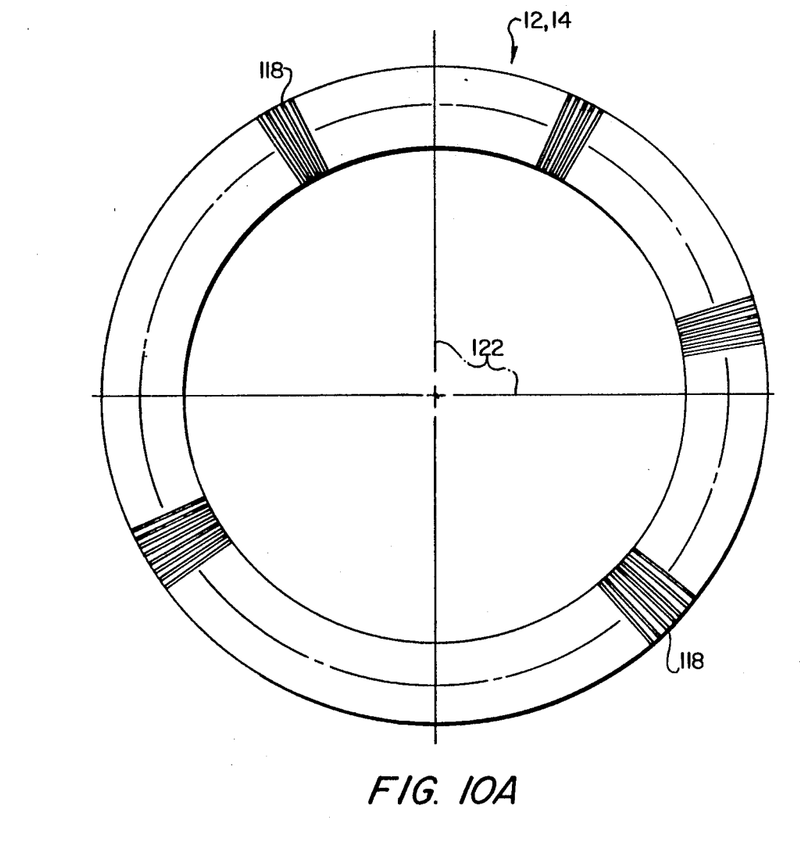
FIG. 10A is a representative view of a straight slot stator arrangement.
Figure 10B:
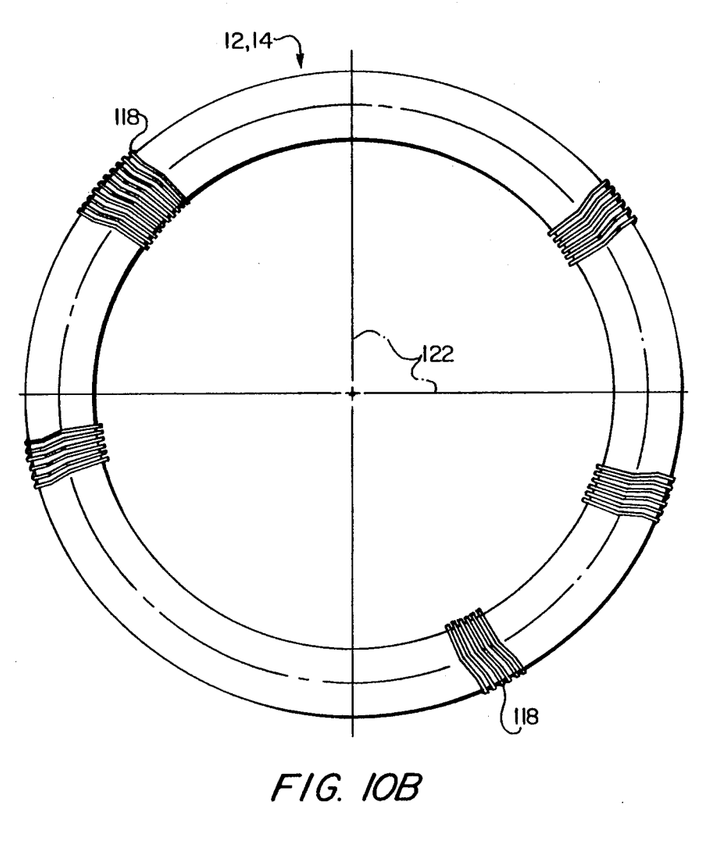
FIG. 10B is a representative view of the skewed stator slot feature of the present invention.

An additional feature of the present invention which reduces torque ripple and the resultant noise is illustrated in FIG. 10. FIG. 10A represents a first configuration of disk-shaped stators 12 and 14 with the individual slots 118 for the stator coils being collinear with a diameter, e.g. lines 122, of each stator. In an embodiment of the present invention, as shown in FIG. 10B, stator slots 118 are skewed, i.e. they lie at an angle to a diameter, e.g. lines 122, of each stator. This feature also helps to reduce the cogging effect by placing a portion (preferably half) of the pole cogging component out of phase with respect to a different portion (preferably half) of the pole cogging component.

Figure 11A:
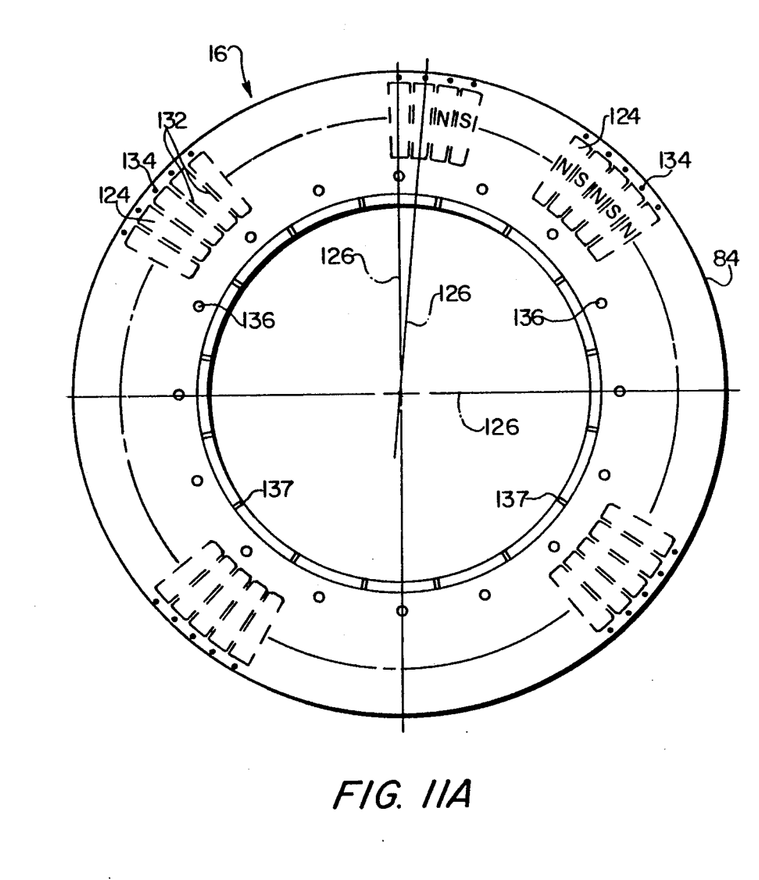
FIG. 11A is a representative view of a straight magnet pole arrangement.
Figure 11B:
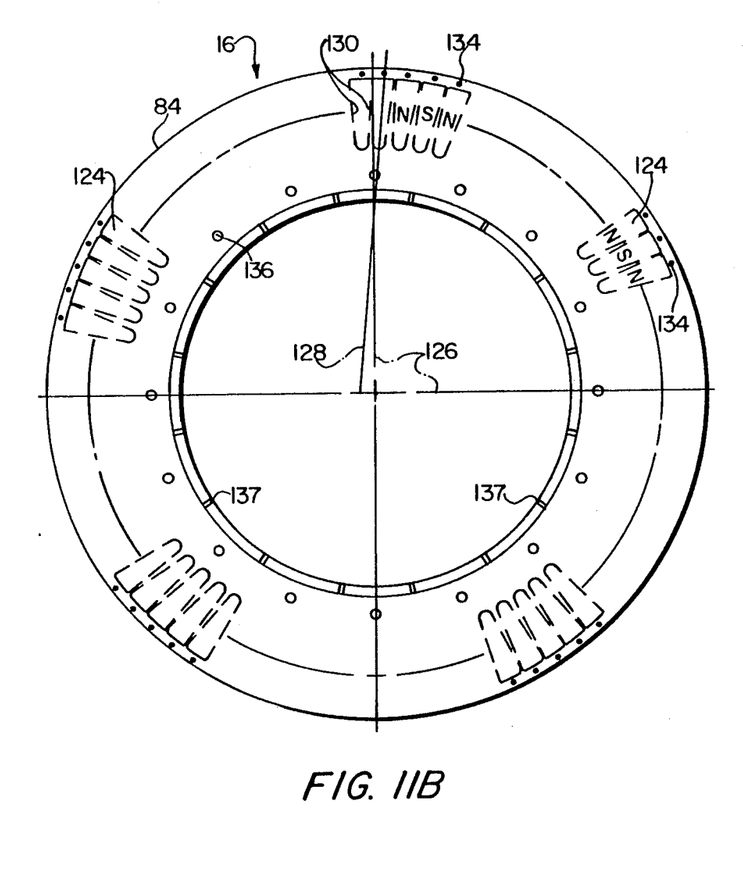
FIG. 11B is a representative view of the skewed magnet pole arrangement of the present invention.

FIG. 11 illustrates yet another feature of the present invention that reduces cogging, torque ripple and the resulting noise in a propulsion motor. FIG. 11A represents a first configuration of disk-shaped rotor 16 viewed from the side facing, for example, stator 14 with torque plate 28 and runners 78, 80 and 82 removed. The rotor magnets 124 are configured with alternating north and south poles, as shown. A mechanical shield, as discussed previously with reference to FIG. 4, is attached to the rotor disk at the outer edge by one fastener per magnet in holes 134, and at the inner edge by fasteners in holes 136, which are spaced 22¼ degrees apart. Fasteners 88 that attach runner 82 to rotor 16 (as shown in FIG. 4) use holes 137 shown in cross-section in FIG. 11. In this first configuration, the poles are straight with respect to diameters, e.g. lines 126, of the rotor. In an embodiment of the invention, as shown in FIG. 11B, the poles of the rotor are skewed, i.e. diameters 126 are not collinear with the longitudinal axis of the poles. A line passing straight through the longitudinal axis of a pole, for example line 128, will pass through a point that is offset from the center of the rotor. Further, in a preferred embodiment, each pole 124 has a skewed shape in that the sides 130 (FIG. 11B) are slightly curved. This is in contrast to the straight sides 132 of the poles shown in FIG. 11A. This shape is preferred because, in the axial gap motor of the present invention, cogging torque is a function of the radius at which the force occurs. Although both sides 130 of each pole shown in FIG. 11B are curved, at least one side being curved will have a beneficial effect in reducing cogging torque.

Figure 12:
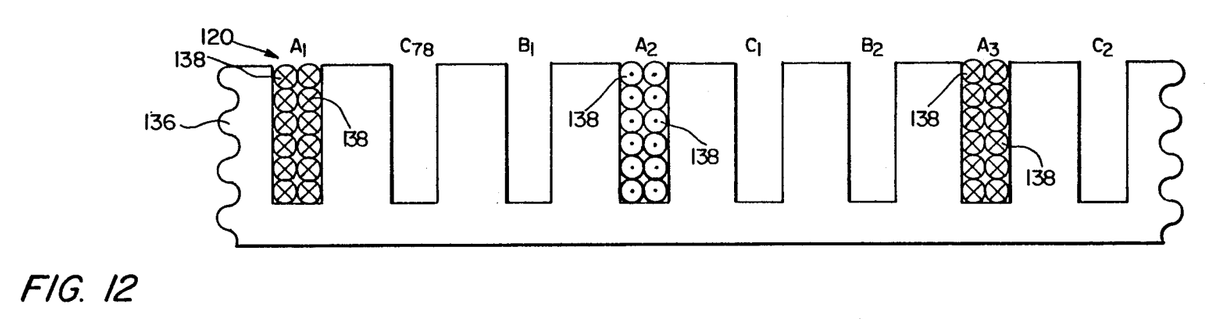
FIG. 12 illustrates a partial stator winding slot arrangement.

Another feature of the present invention which reduces cogging is the large number of poles. As shown in FIG. 11B, seventy-eight (78) permanent magnet poles 124 are formed in rotor 16. The stators each include two hundred and thirty-four (234) slots with three (3) slots (one per phase of the exciting current) for each of the seventy-eight (78) poles. The stator coils are wound as shown in FIG. 12, which illustrates an edge view of a portion of a stator, depicted for the sake of simplicity as being straight. The armature core 136 may be made of M47 low carbon sheet, for example, and may be wound in the following manner.

The slots 120 are labeled A1, C78, B1, A2, C1, B2, A3, C2, B3, continuing around the periphery of the stator core up through and including A78, C77, B78. A conductor (coil) 138 starts, for example, at slot A1 from the outer diameter of the core and goes through to the inner diameter. The conductor continues along the inner diameter and enters slot A2. It exits slot A2 at the outer diameter and returns to slot A1. The conductor continues to be wound through slots A1 and A2 until the completion of 12 turns in each slot. At the completion of the 12 turns in slots A1 and A2, the conductor continues along the outer diameter to slot A3. Slots A3 and A4 are wound with 12 turns in the same manner as slots A1 and A2. At the completion of winding slots A3 and A4, slots A5 and A6 are similarly wound with 12 turns. The end of the conductor at slot A6 will be the termination point and it is connected to an inverter module 34 (see FIGS. 1 and 2, for example). The starting point of the conductor at slot A1 is also connected to the same inverter module. There are forty (40) inverter modules (one spare) for each stator in the preferred embodiment.

Slots B1 through B6 are similarly wound with a different conductor, which is connected to another inverter module. Similarly, slots C1 through C6 are wound with a different conductor, which is connected to another inverter module. Another conductor starts at slot A7 and finishes at slot A12. This process continues until all 234 slots are filled.

As discussed above, several features of the present invention reduce torque ripple and the resultant noise. These features include staggered stators, skewed stator slots and skewed field poles, and utilization of a large number of poles. As yet an additional feature, the present invention utilizes armature current control to compensate for pertubations that are repeatable functions of shaft angle, which is directly related to rotor position. As discussed previously, the stator windings 138 are fed by inverter modules 34. Power inverters for motors are well known in the art and the particular inverter circuit chosen will depend upon the source of power for the motor and the power required by the motor.

Basically, the inverter modules 34 are a controllable current source for the stator windings. As is conventional, the output of each inverter module is chosen in response to the desired output torque. Pulse-width-modulation (PWM), which is also conventional, is utilized to regulate the inverter output. In the preferred embodiment, a high PWM frequency, preferably in the range of 20 KHz, is utilized to minimize PWM ripple amplitude and, more importantly, to permit rapid switching response to rotor current control. Since very rapid switching times are required to achieve the benefits of the present invention, it is preferred that insulated gate bipolar transistors (IGBTs) be selected as the switching elements in the inverter module.

As stated previously, an important advantage of the present invention is the minimization of torque ripple. Torque ripple can arise from many sources including cogging torque (discussed above), variations of the magnetic flux in the air gaps with position, and reluctance. The present invention takes advantage of the fact that much of the total variation in torque is a repeatable function of rotor position and armature current. By varying the current in the motor as a function of rotor position (or shaft angle), the cyclic variations in motor torque can be eliminated, or at least greatly reduced.

Shaft position feedback and motor current feedback are conventional and commonly employed in inverters for proper timing of the switching elements. However, the prior art has failed to consider feedback control for noise reduction.

The present invention utilizes one or more programmable read only memories (PROMs) to digitally store shaft-position-dependent information that is used to determine the value of current for each phase. Each phase of the motor (e.g. a three-phase motor) is fed by an inverter module 34, which preferably utilizes PWM control regulation and IGBT inverter switches. Each inverter module 34 will be controlled, utilizing the information stored in PROM, to produce a current proportional to an input signal.

Figure 13:
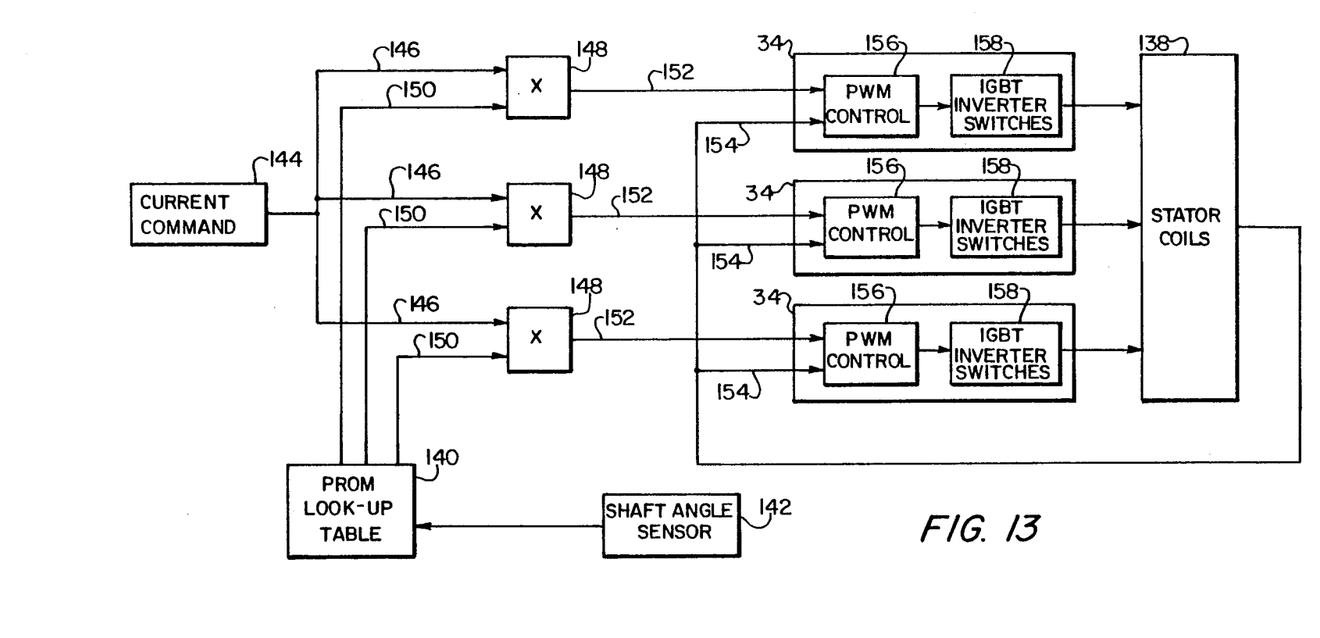
FIG. 13 is a block diagram depicting the stator current control system of the present invention.

FIG. 13 is a block diagram of a basic system for torque ripple control utilizing shaft-position-dependent information. The shaft-position-dependent information is stored digitally in PROM 140. PROM 140 may be a single PROM chip or several chips. Further PROM 140 may be divided into three separate pages of memory (or three separate chips) with each page (or chip) dedicated to one phase or it may be divided into a greater number of page (or chips) with each page (or chip) dedicated to one inverter module or a group of inverter modules. In FIG. 13, only three inverter modules 34 are shown. However, in the present invention, eighty (including two spares) inverter modules are contemplated, with forty modules (one spare) per stator.

The shaft-dependent information will depend upon each particular motor. The major features of the motor torque-per-amp versus angle characteristic are known to the designer before the motor is built. Further confirmation and/or refinement of this information can be determined empirically. To refine the compensation information, a first, theoretical estimate can be made. Then, the motor can be operated and the resulting torque ripple recorded. The compensation required for such torque ripple is then computed using known, conventional techniques. The required compensation so computed can then be combined with the first estimate and the resultant table may be loaded into PROM. This process can be repeated until the residual torque ripple is reduced to a desired minimum.

The PROM look-up table 140 may be indexed from a signal generated by a conventional shaft angle sensor 142. The compensation information is stored in PROM according to the shaft position and is read from PROM in the same manner. A current command 144 is the fundamental control input. Since the motor produces a torque that is nearly proportional to current, the current command can be used for torque control. The current command is fed on signal lines 146 to multipliers 148. The compensation information in PROM 140 is received by multipliers 148 on lines 150. The instantaneous current command for each phase, received by inverter modules 34 on lines 152, is determined by multiplying the current command by the compensation information stored in PROM 140. Each inverter module 34 will include PWM control circuitry 156 and IGBT inverter switches 158. Current feedback lines 154 may be used so that the inverter modules can control the armature current to match that of the instantaneous command current. Utilizing this feature of the present invention, perturbations in torque that are repeatable functions of shaft angle can be effectively reduced to a minimum. This feature, when combined with the other noise reducing features of the present invention, provides a motor that is much quieter than the motors contemplated in the prior art.

The present invention has been described and shown in relation to various preferred embodiments. Detailed descriptions and illustrations of certain known components and operations have been omitted for the sake of clarity and understanding of the present invention. Conventional components and principles will be readily appreciated by those having ordinary skill in the art as will various modifications and changes that can be made to the embodiments disclosed, such embodiments, modifications, and changes being intended to fall within the scope of the invention as defined by the following claims.

We claim:

1. An electric propulsion motor for marine vehicles comprising:
   a disk-shaped rotor and two coaxial disk-shaped stators, said rotor being separated from each of said stators in an axial direction by an air gap;
   said rotor including a plurality of permanent magnets that produce a first magnetic field;
   each stator comprising an armature winding that is connected to a source of electrical current to produce a second magnetic field, said first and second magnetic fields being capable of interacting to create an electromagnetic torque;
   means for coupling said rotor to a propeller shaft for transferring said torque from said rotor to said shaft, and means for detecting the angle of said shaft;
   a current control means for receiving a current control signal and for employing pulse width modulation to control said source of electrical current;
   said current control means including means for storing compensation information related to torque variations that are a function of shaft angle;
   said current control means further including means connected and responsive to said shaft angle detecting means for selecting said compensation information as a function of shaft angle and means for combining said compensation information with said current control signal to control said source of electrical current such that the torque variations that are a function of shaft angle are minimized; and
   wherein said means for coupling said rotor to said propeller shaft includes means within the motor for isolating said shaft from sound produced by said motor.

2. An electric propulsion motor as in claim 1 wherein said sound isolating means comprises an elastomer.

3. An electric propulsion motor as in claim 1 further including an annular plate connected to and extending from said rotor and a disk connected to and extending from said propeller shaft and wherein said sound isolating means is sandwiched between said disk and said plate.

4. An electric propulsion motor for marine vehicles comprising:
   a disk-shaped rotor and two coaxial disk-shaped stators, said rotor being separated from each of said stators in an axial direction by an air gap;
   said rotor including a plurality of permanent magnets that produce a first magnetic field;
   each stator comprising an armature winding that is connected to a source of electrical current to produce a second magnetic field, said first and second magnetic fields being capable of interacting to create an electromagnetic torque;

means for coupling said rotor to a propeller shaft for transferring said torque from said rotor to said shaft, and means for detecting the angle of said shaft;

a current control means for receiving a current control signal and for employing pulse width modulation to control said source of electrical current;

said current control means including means for storing compensation information related to torque variations that are a function of shaft angle;

said current control means further including means connected and responsive to said shaft angle detecting means for selecting said compensation information as a function of shaft angle and means for combining said compensation information with said current control signal to control said source of electrical current such that the torque variations that are a function of shaft angle are minimized; and circumferential thrust bearings facing both sides of said rotor, said rotor including bearing surfaces for engagement with said thrust bearings.

5. An electric propulsion motor as in claim 4 wherein said circumferential thrust bearings comprise a plurality of spaced bearing assemblies.

6. An electric propulsion motor as in claim 5 wherein said spaced bearing assemblies comprise tilting pad thrust bearings.

7. An electric propulsion motor as in claim 4 wherein said circumferential thrust bearings comprise solid annular bearings.

8. An electric propulsion motor as in claim 4 wherein said rotor bearing surfaces comprise annular runners.

9. An electric propulsion motor as in claim 4 wherein said circumferential thrust bearings are located in proximity to a magnetically active portion of said rotor.

10. An electric propulsion motor for marine vehicles comprising:

a disk-shaped rotor and two coaxial disk-shaped stators, said rotor being separated from each of said stators in an axial direction by an air gap;

said rotor including a plurality of permanent magnets that produce a first magnetic field;

each stator comprising an armature winding that is connected to a source of electrical current to produce a second magnetic field, said first and second magnetic fields being capable of interacting to create an electromagnetic torque;

means for coupling said rotor to a propeller shaft for transferring said torque from said rotor to said shaft, and means for detecting the angle of said shaft;

a current control means for receiving a current control signal and for employing pulse width modulation to control said source of electrical current;

said current control means including means for storing compensation information related to torque variations that are a function of shaft angle;

said current control means further including means connected and responsive to said shaft angle detecting means for selecting said compensation information as a function of shaft angle and means for combining said compensation information with said current control signal to control said source of electrical current such that the torque variations that are a function of shaft angle are minimized; and a radial bearing remote from said propeller shaft for supporting said rotor.

11. An electric propulsion motor as in claim 10 wherein said radial bearing comprises a plain cylindrical bearing.

12. An electric propulsion motor as in claim 10 wherein said radial bearing comprises a plurality of spaced bearing assemblies.

13. An electric propulsion motor as in claim 4 or 10 wherein said means for coupling said rotor to said propeller shaft includes means within the motor for isolating said shaft from sound produced by said motor.

14. An electric propulsion motor as in claim 13 wherein said sound isolating means comprises an elastomer.

15. An electric propulsion motor as in claim 13 further including an annular plate connected to and extending from said rotor and a disk connected to and extending from said propeller shaft and wherein said sound isolating means is sandwiched between said disk and said plate.

16. An electric propulsion motor as in claim 1 or 10 further including circumferential thrust bearings facing both sides of said rotor, said rotor including bearing surfaces for engagement with said thrust bearings.

17. An electric propulsion motor as in claim 16 wherein said circumferential thrust bearings comprise a plurality of spaced bearing assemblies.

18. An electric propulsion motor as in claim 17 wherein said spaced bearing assemblies comprise tilting pad thrust bearings.

19. An electric propulsion motor as in claim 16 wherein said circumferential thrust bearings comprise solid annular bearings.

20. An electric propulsion motor as in claim 16 wherein said rotor bearing surfaces comprise annular runners.

21. An electric propulsion motor as in claim 16 wherein said circumferential thrust bearings are located in proximity to a magnetically active portion of said rotor.

22. An electric propulsion motor as in claims 1 or 4 further including a radial bearing for supporting said rotor.

23. An electric propulsion motor as in claim 22 wherein said radial bearing comprises a plain cylindrical bearing.

24. An electric propulsion motor as in claim 22 wherein said radial bearing comprises a plurality of spaced bearing assemblies.

25. An electric propulsion motor as in Claims 1, 4 or 10 wherein each said stator includes a plurality of teeth separated by a like plurality of slots, said slots including stator coils; and wherein said two stators are staggered on either side of said rotor such that the teeth of a first on of said stators are positioned axially across the rotor opposite the slots of a second one of said stators, whereby a cogging component of torque ripple is minimized.

26. An electric propulsion motor as in claim 1, 4 or 10 wherein each said stator includes a plurality of teeth separated by a like plurality of slots, said slots including stator coils; and wherein said slots in each said stator are skewed such that they lie at an angle to a diameter of each said stator, whereby a cogging component of torque ripple is minimized.

27. An electric propulsion motor as in claim 1, 4 or 10 wherein said rotor magnets are configured with alternating north and south poles around the circumference of said rotor; and wherein the poles of the rotor magnets are skewed such that diameters of said rotor are not collinear with lines that divide each pole along its longitudinal axis, whereby a cogging component of torque ripple is minimized.

28. An electric propulsion motor as in claim 27 wherein each said pole has a skewed shape in that at least one side of each pole is curved.

29. An electric propulsion motor as in claim 27 wherein said rotor comprises at least fifty permanent magnet poles.

30. An electric propulsion motor as in claim 1, 4 or 10 wherein said current control means includes insulated gate bipolar transistors (IGBTs) as switching elements.

31. An electric propulsion motor as in claim 1, 4 or 10 wherein said means for storing compensation information comprises at least one programmable read only memory (PROM).

32. An electric propulsion motor as in claim 1, 4 or 10 wherein said means for combining said compensation information with said current control signal includes at least one multiplier.

33. An electric propulsion motor as in claim 1, 4 or 10 further including means for mounting said motor within a hull of said marine vehicle, said mounting means including means for isolating said hull from sound and vibration generated by said motor.

34. An electric propulsion motor as in claim 1, 4 or 10 wherein said marine vehicle includes two electric propulsion motors and two propeller shafts, and wherein a first motor rotates a first propeller shaft in a first rotating direction and a second motor rotates a second propeller shaft in a second direction that is counter to said first direction.

35. An electric propulsion motor as in claim 1, 4 or 10 wherein said current control means employs a pulse width modulation frequency of approximately 20 KHz.

* * * * *

UNITED STATES PATENT AND TRADEMARK OFFICE
CERTIFICATE OF CORRECTION

PATENT NO. : 5,229,677
DATED : July 20, 1993
INVENTOR(S) : Thomas B. Dade, et al.

It is certified that error appears in the above-identified patent and that said Letters Patent is hereby corrected as shown below:

In column 12, Claim 25, line 6, "on" should read "one".

Signed and Sealed this

Fifth Day of April, 1994

*Attest:*

BRUCE LEHMAN

*Attesting Officer*     *Commissioner of Patents and Trademarks*